(12) United States Patent
Hanada et al.

(10) Patent No.: US 7,432,958 B2
(45) Date of Patent: Oct. 7, 2008

(54) IMAGE PICKUP APPARATUS WITH FUNCTION OF ADJUSTING INCIDENT LIGHT QUANTITY

(75) Inventors: Naoki Hanada, Kanagawa-ken (JP); Hiroyasu Kunimi, Kanagawa-ken (JP); Norio Kurashige, Kanagawa-ken (JP); Tetsuya Oura, Kanagawa-ken (JP); Hiroshi Nishiyama, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 638 days.

(21) Appl. No.: 11/208,550

(22) Filed: Aug. 23, 2005

(65) Prior Publication Data

US 2006/0038914 A1    Feb. 23, 2006

Related U.S. Application Data

(62) Division of application No. 09/678,326, filed on Oct. 3, 2000, now abandoned.

(30) Foreign Application Priority Data

Oct. 7, 1999    (JP)    ............................... P11-287260

(51) Int. Cl.
*H04N 5/225*    (2006.01)
*H04N 5/235*    (2006.01)
*H04N 5/228*    (2006.01)
*H04N 5/262*    (2006.01)

(52) U.S. Cl. .............. 348/220.1; 348/221.1; 348/222.1; 348/239

(58) Field of Classification Search ... 348/220.1–221.1, 348/239, 441, 581
See application file for complete search history.

(56) References Cited

U.S. PATENT DOCUMENTS 4,963,980 A    10/1990    Suga et al.
5,216,511 A    6/1993    Tani (Continued)

FOREIGN PATENT DOCUMENTS

EP    0570 204 A2    11/1993

(Continued)

OTHER PUBLICATIONS

XP000539491: Wen-Hsin Chan et al., "Video CCD Based Portable Digital Still Camera", *IEEE Transactions on Consumer Electronics, IEEE Service Center*, vol. 41, No. 3, pp. 455-459, (Aug. 1995).

*Primary Examiner*—David Ometz
*Assistant Examiner*—Pritham Prabhakher
(74) *Attorney, Agent, or Firm*—Nath Law Group; Jerald L. Meyer; Derek Richmond

(57) ABSTRACT

A video camera which is provided with an inter-line type CCD and also which enjoys a function as a digital still camera. The video camera includes an irising mechanism for adjusting a quantity of light incident upon the CCD, an iris driving circuit for driving the irising mechanism, and a camera microcomputer for controlling operations of adjusting an incident-light quantity by the irising mechanism by controlling the iris driving circuit. The camera microcomputer controls the iris driving circuit to drive the irising mechanism, whereby the incident light upon the CCD is blocked to perform only a read-out operation while data of all the pixels is read out from the CCD.

16 Claims, 7 Drawing Sheets

U.S. PATENT DOCUMENTS

| | | | |
|---|---|---|---|
| 6,519,000 B1 * | 2/2003 | Udagawa | 348/220.1 |
| 7,315,328 B1 * | 1/2008 | Ide et al. | 348/311 |
| 7,330,644 B1 * | 2/2008 | Nemoto et al. | 386/117 |
| 7,352,391 B1 * | 4/2008 | Hatakeyama | 348/223.1 |

FOREIGN PATENT DOCUMENTS

| | | |
|---|---|---|
| EP | 0 683 606 A1 | 11/1995 |
| GB | 2 125 250 A | 2/1984 |

* cited by examiner

IMAGE PICKUP APPARATUS WITH FUNCTION OF ADJUSTING INCIDENT LIGHT QUANTITY

This Application is a divisional of U.S. Ser. No. 09/678,326 filed on Oct. 3, 2000 now abandoned and claims benefit of priority under 35 USC § 119 to Japanese Patent Application No. P11-287260, filed on Oct. 7, 1999, the entire contents of which are incorporated herein by reference herein.

BACKGROUND OF THE INVENTION

1. Field of the Invention

The present invention relates to an image pickup apparatus provided with an image sensing means by which pixel data of a half of all the pixels can be read out in one read-out operation, and more particularly, it relates to an image pickup apparatus suitable for a video camera provided with a function of recording still pictures on a memory card.

2. Description of the Related Art

FIG. 1 shows a system block diagram of a conventional video camera.

In FIG. 1, a light from a subject etc. passes through a lens system 99 provided with a focusing mechanism (not shown) and then a complementing filter in which Cy (cyan), G (green), Ye (yellow), and Mg (magenta) color filters are arranged corresponding to their respective pixels and then is made incident on a CCD (Charge Coupled Device) 101.

The CCD 101 is of an inter-line type, i.e. it is driven for field read-out by a drive signal from a timing generator (TG) 104. That is, from the CCD 101 driven by the timing generator 104 are read out picked-up image signals of vertically adjacent pixels as mixed on this CCD.

More specifically, as shown in FIG. 2, in the first field for example, the picked-up image signals of pixels respectively corresponding to vertically adjacent color filters of Cy+G, Ye+Mg, Cy+G, Ye+Mg, . . . in an A1 line are mixed on this CCD and read out, after which the picked-up image signals of pixels respectively corresponding to vertically adjacent color filters of Cy+Mg, Ye+G, Cy+Mg, Ye+G, . . . in the next A2 line are mixed on this CCD and read out. Subsequently, also for each of an A3 line, an A4 line, (not shown), the picked-up image signals of the vertically adjacent pixels are mixed and read out in the same manner. Furthermore, in the second field, the picked-up image signals respectively corresponding to the vertically adjacent color filters of G+Cy, Mg+Ye, G+Cy, Mg+Ye, . . . in a B1 line are mixed on the CCD and read out, and then, the picked-up image signals of the vertically adjacent pixels for each of a B2 line, a B3 line, . . . lines are also mixed and read out in the same manner. The picked-up image signals output from this CCD 101 are sent to a CDS/AGC (Correlation Double Sampling/Automatic Gain Control) circuit 102.

The CDS/AGC circuit 102 utilizes correlation double sampling (CDS) processing, to remove noise from the picked-up image signal, and it also utilizes automatic gain control (AGC) processing, to control the gain of the picked-up image signal at a desired value. The picked-up image signal output from the CDS/AGC circuit 102 is sent to an ADC (A/D converter) circuit 103.

The ADC circuit 103 converts an analog picked-up image signal output from the CDS/AGC circuit 102 into digital picked-up image data (A/D conversion). The picked-up image data output from the ADC is sent to a DSP (Digital Signal Processor) 116 enclosed by a dotted line in FIG. 1.

The DSP 116 performs the following various signal processes in response to an instruction sent from a camera microcomputer 105.

The picked-up image data input into the DSP 116 is first sent to a Y/C separating unit 106. The Y/C separating unit 106 separate thus supplied picked-up image data into brightness data and color data. The output data from the Y/C separating unit 106 is sent to an IWD (Horizontal Pixel Extraction) unit 107.

The IWD unit 107 extracts only the data corresponding to each pixel which provides a horizontal effective pixel on the CCD 101, based on camera shake information including a quantity of camera shake and a velocity of camera shake. That is, the IWD unit 107 extracts only such data of those data pieces corresponding to each pixel on the CCD 101 that lies in a direction in which the camera shake can be corrected.

The data output from the IWD unit 107 is sent from a signal switching unit 108.

The signal switching unit 108, in response to, for example, an instruction from the camera microcomputer 105, makes switching between data output from the IWD unit 107 and reproduction data sent from a later-mentioned recording/play-back device 114 and then sends thus selected data to an FMC (Video Memory Controller) unit 109. That is, for example, when data of pictures which are being imaged by this video camera is recorded by the recording/play-back device 114 or when this data is output as it is to the outside as a video signal, the signal switching unit 108 is set to send the output data of the IWD unit 107 to the FMC unit 109; on the other hand, when the reproduction data is output from the recording/play-back device 114 to outside as a video signal, the signal switching unit 108 is set to send the reproduction data of the recording/play-back device 114 to the FMC unit 109.

The FMC unit 109 controls read/write operations of data to a VRAM 113 serving as a video memory. In this case, the read/write operations of data to the VRAM 113, am controlled by the FMC unit 109 for the purpose of, for example, fine adjustment in correction for camera shake, and the realization of various production effects on the picture.

The fine adjustment in correction for camera shake here means to perform camera shake correction processing based on camera shake information with a precision of less than two horizontal pixels in one line. Accordingly, the FMC unit 109 controls data read/write operations to the VRAM 113 to perform the fine adjustment in correction for camera shake with a precision of less than two horizontal pixels in one line. Furthermore, as the production effects on the pictures, specifically, the generation of, for example, still pictures such as souvenir photographs, multi-pictures in which a plurality of pictures are arranged on one screen, sepia-tone pictures, and black-and-white pictures, and the image processing such as fading and wiping may be employed. Therefore, the EMC unit 109 reads out data from the VRAM 113 which is necessary for realization of these production effects. The data thus read out by the FMC unit 109 from the VRAM 113 is sent to a YNR (Brightness Signal Noise Reducer) unit 110.

The YNR unit 110 suppresses the noise of brightness data. The data output from this YNR unit 110 is sent to the recording/play-back device 114 as demanded by a user of this video camera, to be recorded, for example, on such a recording medium as a magnetic tape, a magnetic disk, or an optical disk or it is sent to an ENC (Color Encoder) unit 111 to be output to outside as a video signal.

The ENC unit 111 converts thus supplied data into a signal conforming to such TV broadcasting scheme as, for example, NTSC (National Television System Committee), PAL (Phase Alternation by Line), SECAM (Sequential Couleur a Memoirs), etc. The signal from this ENC unit 111 is sent to a DAC (D/A converter) unit 112.

The DAC unit 112 converts the data from the ENC unit 111 into an analog video signal. The video signal from the DAC unit 112 of the DSP 116 is output to outside from an output terminal 115.

The recording/play-back device 114, on the other hand, responds to a demand from the user of this camera, to reproduce the data previously recorded on the recording medium, thereby sending the reproduction data to the signal switching unit 108. The reproduction data supplied to the signal switching unit 108 passes through the EMC unit 109, the YNR unit 110, the ENC unit 111, and the DAC unit 112 and then is output to outside as a video signal from the output terminal 115.

Next, FIG. 3 shows a system block diagram of a conventional digital camera (digital still camera).

In FIG. 3, a light from a subject passes through a lens mechanism 117 driven by a focusing mechanism 118 capable of auto-focusing, an irising mechanism 119 capable of auto-irising, and a complementing filter 120 in which Cy (cyan), G (green), Ye (yellow), and Mg (magenta) color filters are arranged and then is made incident on a CCD 121.

The CCD 121, which is of a progressive scanning type, is driven for frame read-out by a drive signal from the timing generator (TG) 124. That is, in contrast to the above-mentioned example of FIG. 1, from the CCD 121 driven by this timing generator 123 are read out the picked-up image signals of the respective CCD pixels without being mixed.

More specifically, as shown in FIG. 4, the picked-up image signals of all the pixels are read out from the CCD in such an order as those for the pixels corresponding to the CY, Ye, Cy, . . . color filters in a line a1, the pixels corresponding to the Cy, Ye, Cy, Ye, . . . color filters in a line a2, and the pixels corresponding to the G, Mg, G, Mg, . . . color filters. The picked-up image signals thus output from the CCD 121 are sent to a CDS/AGC circuit 122.

The CDS/AGC circuit 122, as in the configuration of FIG. 4, utilizes correlation double sampling processing to removes noise and also automatic gain control processing to control the gain of the picked-up image signal at a desired value. The picked-up image signal output from this CDS/AGC circuit 102 is converted at the ADC circuit 103 into digital picked-up image data and then sent to a DSP 139 enclosed by a dotted line in FIG. 3.

The DSP 139 performs the following various signal processes.

The picked-up image data input to the DSP 139 is first sent to a DMACTL (DMA controller) unit 127. The DMACTL unit 127 transfers the picked-up image data of one screen in a DMA (Direct Memory Access) manner to a memory in a microcomputer 125.

The microcomputer 125 utilizes software processing to separate the picked-up image data thus supplied from the DMACTL unit 127 into brightness data and color data, to generate still-picture data. The still-picture data thus generated by the microcomputer 125 again passes through the DMACTL unit 127 in DMA transfer up to a DRAMCTL (External Memory Controller) unit 128.

The DRAMCTL unit 128 controls the read/write operations of data to a DRAM 133 serving as the external memory. At this point in time, the DRAMCTL unit 128 writes to the DRAM 133 the still-picture data supplied via the DMACTL unit 127 from the microcomputer 125. Furthermore, the DRAMCTL unit 128 always reads out the still-picture data, from the DRAM 133 even when the microcomputer 125 is executing other processing, thus sending that still-picture data to an FCNV (Clock Converter) unit 129.

The FCNV unit 129 converts the clock signal for still-picture data from the clock signal used in the microcomputer 125 into a clock signal used at the following-stage ENC unit 131; Output data from the FCNV unit 129 is sent to a YNR (Brightness Signal Noise Reducer) unit 130.

The YNR unit 130 suppresses the noise of the brightness data.

Data output from the YNR unit 130 is sent to the ENC unit 131.

The ENC unit 131 converts thus supplied data into a signal conforming to such a TV broadcasting scheme as NTSC, PAL, or SECAM. The signal from the ENC unit 131 is sent to a DAC unit 132.

The DAC unit 132 converts the data from the ENC unit 121 into an analog video signal. The video signal output from the DAC unit 132 of the DSP 139 is output to outside from an output terminal 138. Furthermore, the still-picture data generated by the microcomputer 125 undergoes picture compression processing by use of software processing in response to a demand from the user of this digital camera and then is recorded on a detachable memory card 126 provided with a semiconductor memory. The compressed data recorded on the memory card 126 is read out from the memory card 126 in response to a demand from this digital camera user and then taken into the microcomputer.

The microcomputer 125, after thus taking in the compressed data from the memory card 126, decompresses that data using software processing, to restore still-picture data. The still-picture data thus restored by the microcomputer 125 passes through the DMACTL unit 127 in DMA transfer and is sent to the DRAMCTL unit 128. The still-picture data thus sent to the DRAMCTL unit 128 passes through, in almost the same manner as mentioned above, the FCNV unit 129, the YNR unit 130, the ENC unit 131, and the DAC unit 132 and then is output from the output terminal 138 as a video signal.

Furthermore, at the digital camera shown in FIG. 3, the still-picture data restored by the microcomputer 125 can be transferred, for example, to a personal computer by, for example, infrared communications by an IrDA (Infrared Communication) unit 134, asynchronous serial communications by a USART (Asynchronous Serial Communication) unit 135, or serial communications by a PORT unit 137. A TIMER (Timer) unit 136 is provided for generating date-and-time information, which is added to each still picture as a photography date and time.

At the digital camera shown In FIG. 3. still-picture data transferred, for example, from a personal computer in infrared communications can be received at the IrDA unit 134, still-picture data transferred, for example, from a personal computer in asynchronous serial communications can be received at the UART unit 135, and also still-picture data transferred, for example, from a personal computer in serial communications can be received by the PORT unit 137.

The above-mentioned conventional video camera shown in FIG. 1 uses a field-read-out type CCD, thus suffering from a disadvantage of a rather low vertical resolution of about 240 pixels of a field still picture. Moreover, the video camera of FIG. 1 configures a frame picture of two field pictures, so that such a frame still picture thus made of two field pictures has a problem of, for example, doubling of a moving subject because of a difference in time between these two field pictures. That is, according to the NTSC scheme, for example, two field pictures have a mutual time difference of 1/60 second, so that one still picture generated of these two field pictures would have the image shift of 1/60 second.

The conventional digital camera shown in FIG. 3, on the other hand, uses a frame-read-out type CCD, so that it, can enjoy a high vertical resolution and also obtain a still picture without doubling of a moving subject. The frameread-out type CCD, however, is generally more expensive than the field-read-out type CCD and cannot easily by lowered in costs.

Furthermore, the above-mentioned conventional digital camera shown in FIG. 3 requires rather long time in processing because it always uses software programs to execute processes of the separation of picked-up image data into brightness data and color data as well as also various automatic control processes of, for example, the auto-focus control by the focusing mechanism 118, the auto-iris control by the irising mechanism 119, and the auto-white balancing.

SUMMARY OF THE INVENTION

In view of the above, it is an object of the present invention to provide an image pickup apparatus which can obtain a still picture without doubling of a moving subject while keeping high vertical resolution and also which can reduce processing time and be lowered in costs.

To achieve the above-mentioned object, there is provided an image pickup apparatus which comprises: imaging means for performing only one read-out operation to read out data of half of all the pixels; incident-light quantity adjusting means for adjusting a quantity of light incident upon the above-mentioned photographing means; and drive/control means for driving/controlling the above mentioned incident-light quantity adjusting means in such a manner as to block the light incident upon the above mentioned imaging means while data of all the pixels is read out from the above-mentioned imaging means.

According to the image pickup apparatus of the present invention, while all the pixel data is read out from the imaging means which reads out data of half of all the pixels by only one read-out operation, the incident light can be blocked to obtain a still picture without doubling of a moving subject, thus providing a picture having a higher vertical resolution. Furthermore, one of the specific examples of the imaging means which reads out the data of half of all the pixels by one read-out operation is an inter-line type CCD, which is less expensive than a progressive type CCD, thus contributing to the lowering of the costs of the apparatus.

A preferred embodiment of the invention further comprises: memory means for storing all the pixel data read out from the above-mentioned. photographing device; field generating means for fetching pixel data every two adjacent lines out of the data of all the pixels stored in the above-mentioned memory means, and summing the thus fetched pixel data to thereby generate a fist field and a second field shifted by one line from the first field; and picture generating means for generating one frame of still pictures based on data of pixels of the first field and the second field.

According to this embodiment, all the pixel data obtained by one charge accumulation operation by the imaging means can be stored to fetch pixel data every two adjacent lines out of all the pixel data and sum the thus fetched data pieces, to generate the first and second fields, so that one frame of still picture can be made of these first and second fields, to obtain a still picture without doubling of a moving subject, thus providing a higher vertical resolution.

Furthermore, as the imaging means, for example, an interline type CCD, which is expensive than a progressive type one, may be used, thus lowering the costs of the apparatus.

Another preferred embodiment of the invention further comprises: display-format converting means for mutually converting the picture display format between a first picture display format and a second one.

According to this embodiment, the first or second picture-display format can be converted to the second or first format respectively to handle both, for example, a picture-display format used by a video camera and, that used by a digital still camera, so that one apparatus can function as both a video camera configuration and a digital still camera configuration which are provided thereon, to for example realize the software processing executed by a conventional digital still camera by using a hardware configuration of the video camera, thus resulting in reduction in the processing time and lowering of the costs due to the shared use of the configurations. In addition, it can be provided with functions of both the video camera and the digital still camera, to copy or transfer the picture data between, for example, a video tape and a memory card.

A further another preferred embodiment of the invention comprises: mixing means for mixing a first and second pictures.

According to this embodiment, the mixing means provided for mixing the first and second pictures makes it possible to prevent double-imaging of a moving subject, to obtain a picture of a higher vertical resolution, to reduce the processing time, to lower the costs, and also to mix, for example, a title picture with a picked-up moving picture.

The nature, principle and utility of the invention will become more apparent from the following detailed description when read in conjunction with the accompanying drawings.

DESCRIPTION OF THE PREFERRED EMBODIMENTS

The following will describe preferred embodiments of the invention with reference to the accompanying drawings.

Figure 5:
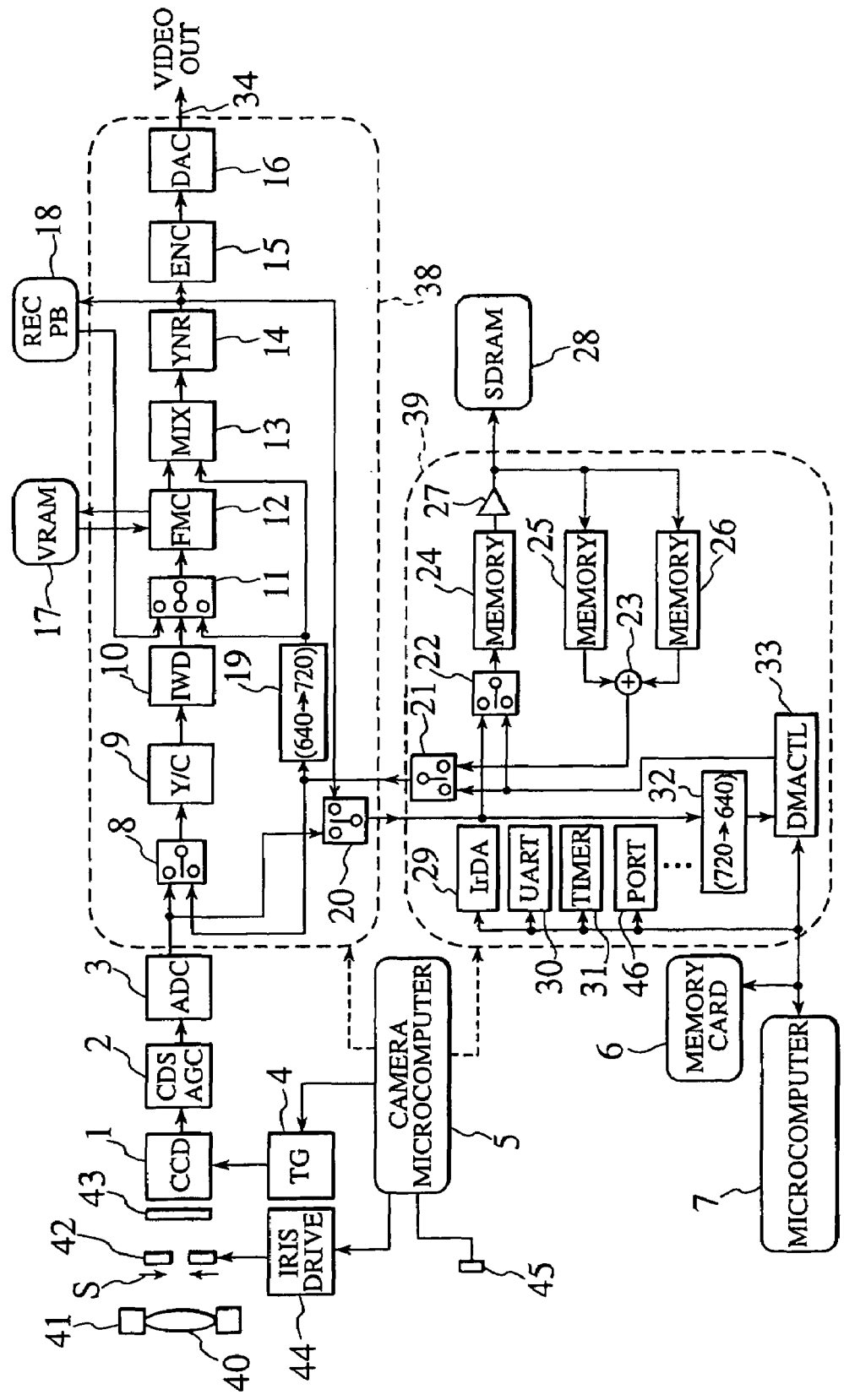
FIG. 5 is a block diagram indicating a rough configuration of a video camera according to one embodiment of the invention.

FIG. 5 shows a system block diagram of a video camera provided with a still-picture pickup function as one embodiment of the image pickup apparatus according to the invention.

First the following will describe the configuration and operations of a case where the video camera according to this embodiment is used to take a moving picture usually (moving-picture pickup mode).

In FIG. 5, a light from a subject passes through a lens system driven by a focusing mechanism capable of auto-focusing, an irising mechanism 42 capable of auto-irising, and a complementing filter 43 in which Cy (cyan), G (green), Ye (yellow), and Mg (magenta) color filters are arranged, and then is made incident upon a CCD 1. The CCD 1 shown in FIG. 5 is of an inter-line type.

When the video camera according to this embodiment is used to take a moving picture usually (moving-picture pickup mode), a drive signal from a timing generator 4 is used to drive this CCD 1 in the field-read-out mode. That is, when the video camera according to this embodiment is used to take a moving picture usually, as mentioned above with respect to FIG. 2, picked-up image signals of vertically adjacent pixels from the CCD 1 driven by the timing generator 4 are mixed on this CCD and read out. The picked-up image signals thus output from this. CCD 1 are sent to a CDS/AGC (Correlation Double Sampling/Automatic Gain Control) circuit 2.

The CDS/AGC circuit 2 performs correlation double sampling (CDS). processing to, remove noise from the picked-up image signal and also automatic gain control (AGC) processing to control the gain of the picked-up image signal at a desired value. The picked-up image signal output from the CDS/AGC circuit 2 is sent to an ADC (A/D converter) circuit 3.

The ADC circuit 3 converts an analog picked-up image signal output from the CDS/AGC circuit 2 into digital picked-up image data. The picked-up image data thus output from the ADC circuit 3 is sent to a first signal processing block 38 enclosed by a dotted line in FIG. 5.

The first signal processing block 38 responds to an instruction from a camera microcomputer 5, to execute the following various signal processes.

The picked-up image data input to the first signal processing block 38 is sent to signal switching units 8 and 20 controlled in transfer operation by the camera microcomputer 5. When the video camera according to this embodiment is used to take a moving picture usually, the picked-up image data output from the ADC circuit 3 is sent via the signal switching unit 8 to a Y/C separating unit 9.

The Y/N separating unit 9 separates the picked-up image data output from the signal switching unit 8 into brightness data and color data. The output data from the Y/C separating unit 9 is sent to an IWD (Horizontal Pixel Extraction) unit 10.

The IWD unit 10 extracts only such data as corresponding to those pixels that provide horizontal effective pixels on the CCD 1,' based on camera shake information including a quantity of camera shake and a velocity of camera shake detected by a camera shake detecting circuit (not shown). That is, the IWD unit 10 extracts only such data of those data pieces corresponding to each pixel on the OCD 1 that lies in a direction in which the camera shake can be corrected. The data output from the IWD unit 10 is sent to a signal switching unit 11 controlled in its transfer operation by the camera microcomputer 5.

The signal switching unit 11, based on an instruction from the camera microcomputer 5, selectively makes switching among the data output from the IWD unit 10, the reproduction data from a later-mentioned recording/play-back device (REC/PB) 18, and the output data from a later-mentioned horizontal pixel density converting (640-720) unit 19 and then output thus selected data to send it to an FMC (Video Memory Controller) unit 12. That is, for example, when data of a picture which is being taken by the video camera according to this embodiment is recorded by the recording/play-back device 18 or when the data is output as is to outside as a video signal, the signal switching unit 11 is set to send the output data from the IWD unit 10 to the FMC unit 12; when the reproduction data from the recording/play-back device 18 is output to outside as a video signal, the signal switching unit 11 is set to send the reproduction data from the recording/play-back device 18 to the FMC unit 12; and, in addition, when the still-picture data after undergoing later-mentioned horizontal pixel density conversion (640-720) is used, the signal switching unit 11 is set to send the output data from the horizontal pixel density converting (640-'720) unit 19 to the FMC unit 12.

The FMC unit 12 then controls data read/write operations to a VRAM 17 serving as a video memory. In this case, controlling by the FMC unit 12 of the data read/write operations to the VRAM 17 is, in almost the same manner as mentioned above with respect to FIG. 1, performed to realize, for example, fine adjustment in correction for camera shake and a variety of production effects on the pictures. The data read out by the FMC unit 12 from the VRAM 17 is sent via a later-mentioned MIX (picture mixing) unit 13 to a YNR (Brightness Signal Noise Reducer) unit 14.

The YNR unit 14 suppresses noise of the brightness data. The data output from this YNR unit 14 is sent to the recording/play-back device 18, an ENC (Color Encoder) unit 15, and the later-mentioned signal switching unit 20.

The ENC unit 15 converts thus supplied data into a signal conforming to, for example, such a TV broadcasting scheme as NTSC, PAL, or SECAM. The signal output from this ENC unit 15 is sent to a DAC. (D/A converter) unit 16.

The DAC unit 16 converts the data from the ENC unit 15 into an analog video signal. The video signal from the DAC unit 16 of the first signal processing block 38 is sent to outside from an output terminal 34.

The recording/play-back 18, on the other hand, responds to an instruction from the user of this video camera, to record the data output from the YNR unit 14 on, for example, such a recording medium as a magnetic tape, a magnetic disk, or an optical disk, and it also responds to an instruction from this video camera user, to reproduce the data previously recorded on the recording medium and sends that reproduction data to the signal switching unit 11. The signal switching unit 11, when the recording/play-back device 18 is performing play-back operations, is set to send the reproduction data from the recording/play-back device 18 to the FMC unit 12. The reproduction data from the signal switching unit 11 is sent to a configuration following the FMC unit 12, to be, for example, output to outside as a video signal or recorded on a memory card 6 as mentioned later.

Next, the configuration and operations of the case where the video camera according to this embodiment is used to take a still picture (still-picture pickup mode) is described.

When the video camera according to this embodiment is used to take a still picture (still-picture pickup mode), the CCD 1 is driven in the frame-read-out mode by a drive signal from the timing generator 4. That is, for example, when a still picture is generated and recorded at desired shutter timing in the usual moving-picture pickup mode, at the video camera according to this embodiment, the inter-line type CCD 1 is driven in the frame-read-out mode, to cause charge accumulated on each pixel to be divided into two fields and read out, in contrast to the case of the field-read-out mode at the time of taking a moving picture where picked-up image signals of the vertically adjacent pixels on the CCD 1 are mixed.

Figure 4:
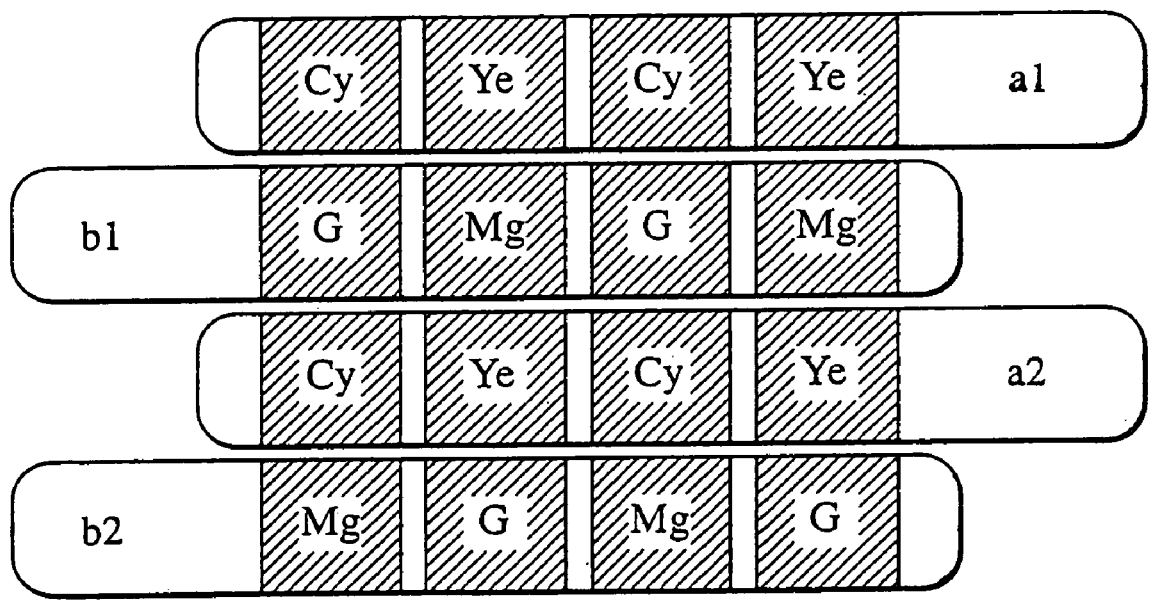
FIG. 4 is an illustration explaining an operation of frame-reading-out of a progressive scanning type CCD.

The following will specifically describe the CCD 1 read-out operations in the still-picture pickup mode with reference to FIG. 4. In the following description, a field consisting of a1, a2, . . . lines in FIG. 4 is called an A field and a field consisting of b1, b2, . . . lines is called a B field.

In this regard, the inter-line type CCD 1 can read out only either the a1 or b1 line, the a2 or b2 line, . . . . Therefore, for the video camera according to this embodiment, when the inter-line type CCD 1 is driven similarly in the frame-read-out mode, the a1, a2, . . . are read out as the A field and the b1, b2, . . . lines as the B field.

Furthermore, a plurality of lights incident on the CCD 1 are specifically made incident mostly uniformly and simultaneously on every pixel of the CCD. Therefore, if the A-field read-out timing is different from the B-field read-out timing, that is, if charge is accumulated in the B field when the A field is being read out and vice versa, a picture given by the A field and that given by the B field are shifted in time from each other. In this case, one still-picture frame picture generated of these A-field and B-field pictures consisting of these time-wise shifted pictures would be a doubled still picture in which time-wise shifted pictures are superposed on each other, thus being unsuited as a still picture desired to be of a high resolution.

Figure 6:
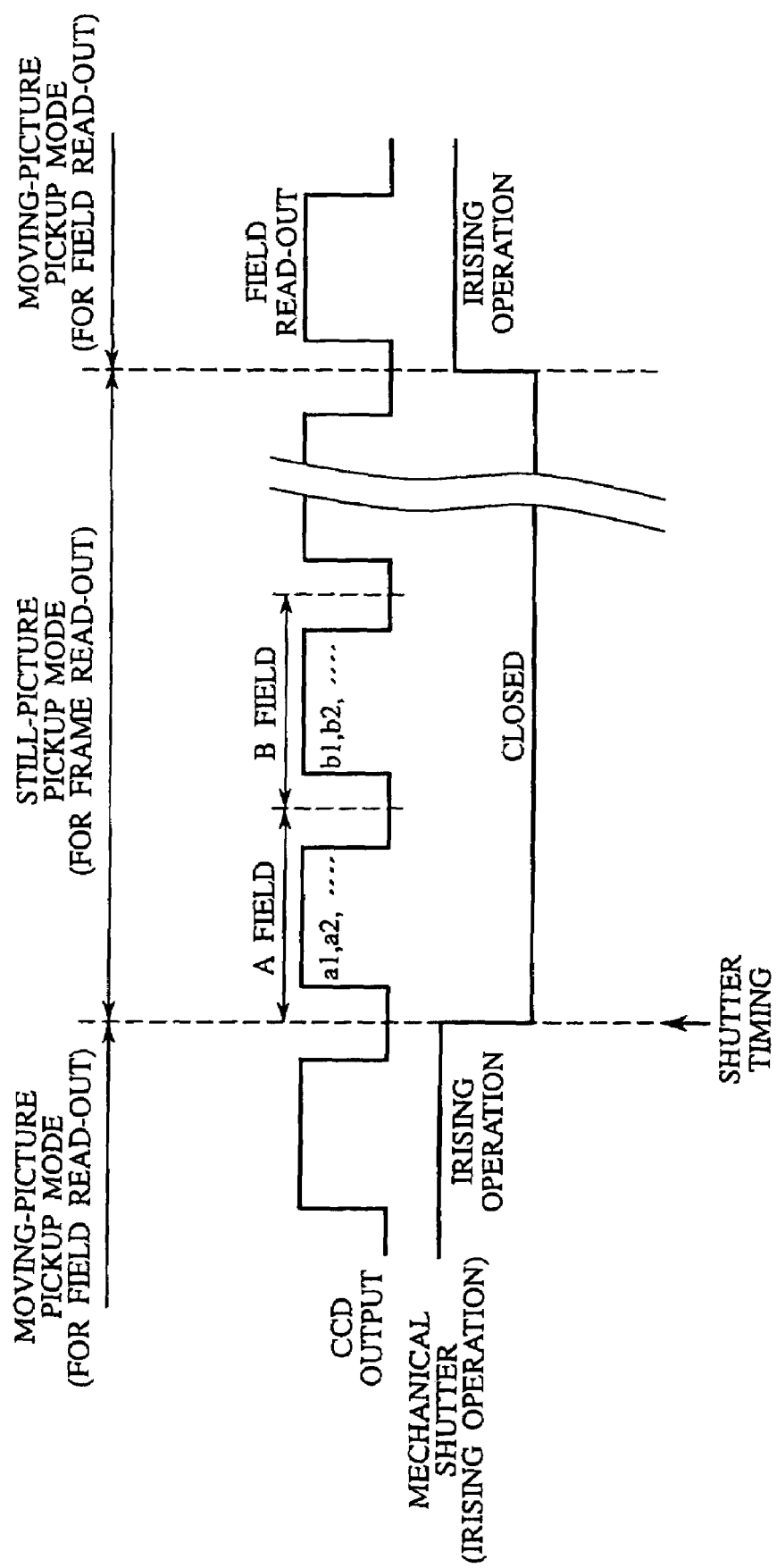
FIG. 6 is a timing chart used for explaining a CCD read-out mode when a moving picture and a still picture are imaged by the video camera of FIG. 5.

To guard against this, when the video camera according to this embodiment is used to generate a still picture and record it, as shown in FIG. 6, during a period when the still-picture pickup mode is entered at desired shutter timing, the irising mechanism 42 is driven in an arrow S direction in FIG. 5, to totally close the iris (diaphragm).

That is, when, for example, the user of this video camera presses the shutter button 45 etc. to instruct to take in a picture at desired shutter timing as a still picture, the camera microcomputer 5, for example, controls an irising driving circuit 44 at that shutter timing, to close the iris as shown by the arrow S in FIG. 5, i.e. thus causing the irising mechanism 42 to operate as a mechanical shutter.

After the iris is thus closed, the camera microcomputer 5 controls the timing generator 4, to switch the CCD 1 which has been reading out fields in the moving-picture pickup mode into the frame-read-out mode by which the A and B fields are separately read out to make up one frame as shown in FIG. 6. That is, any charge to be read out as the A and B fields from the CCD 1 after the iris is closed has been accumulated on the CCD 1 at the same timing as each other before the shutter timing, so that even if the A and B fields are read out separately as shown in FIG. 6 (1. e., even if the A and B fields are read out at mutually different timing points), one frame picture mixed from the A and B fields is obtained as a frame picture without time-wise shift.

In this regard, it is possible to return the video camera according to this embodiment to the usual moving picture pickup mode after a still picture is picked up (taken in) at desired shutter timing.

Next, the picked-up image signals of the lines of the A and B fields read out from the CCD 1 in the above-mentioned still-picture pickup mode are, almost the same manner as in the moving-picture pickup mode, sent via the CDS/AGC circuit 2 and the ADC circuit 3 to the first signal processing block 38 of the DSP.

The picked-up image data of the still picture thus input to the first signal processing block 38 is sent to the signal switching units 8 and 20 controlled in transfer operation by the camera microcomputer 5. When the video camera according to this embodiment is used to take a still picture, picked-up image data output from the ADC circuit 3 is sent via the signal switching unit 20 to a second signal processing block 39.

The data thus input to the second signal processing block 39 is sent to a signal switching unit 22 and a later-mentioned horizontal pixel density converting (720-640) unit 32, in which case that data specifically passes through the signal switching unit 22 controlled in transfer operation by the camera microcomputer and then is stored in a memory 24 serving as a picture-data buffer.

The memory 24 once stores therein the data to be input in synchronism with a clock signal within the video camera according to this embodiment, which data is read out therefrom in synchronism with a clock signal of an SDRAM 28 serving as an external memory. The data thus output from the memory 24 is sent via an output controlling buffer 27 to the SDRAM 28 to be recorded therein.

With this, in the SDRAM 28 are respectively recorded (without being mixed) the pixel data of the lines of the A field and the pixel data of the lines of the B field obtained in the still-picture pickup mode.

The data recorded in the SDRAM 28 is then read out and once stored respectively in memories 25 and 26 serving as a picture buffer memory. These memories 25 and 26 respectively store the data input in synchronism with the clock signal of the SDRAM 28 serving as the external memory, which data is then read out respectively in synchronism with the clock signal within the video camera according to this embodiment.

In this case, the SDRAM 28 serving as the external memory is assumed to have a higher frequency of the operating clock signal than that of the video camera so that it, can perform read/write operations at the same time to mutually different two kinds of addresses. That is, the SDRAM 28 is assumed to be able to write therein data from the video camera according to this embodiment (output data from the memory 24) to a desired address and, at the same time, read out therefrom data recorded in a different address and output it to the video camera according to this embodiment (input it to the memories 25 and 26).

Figure 7:
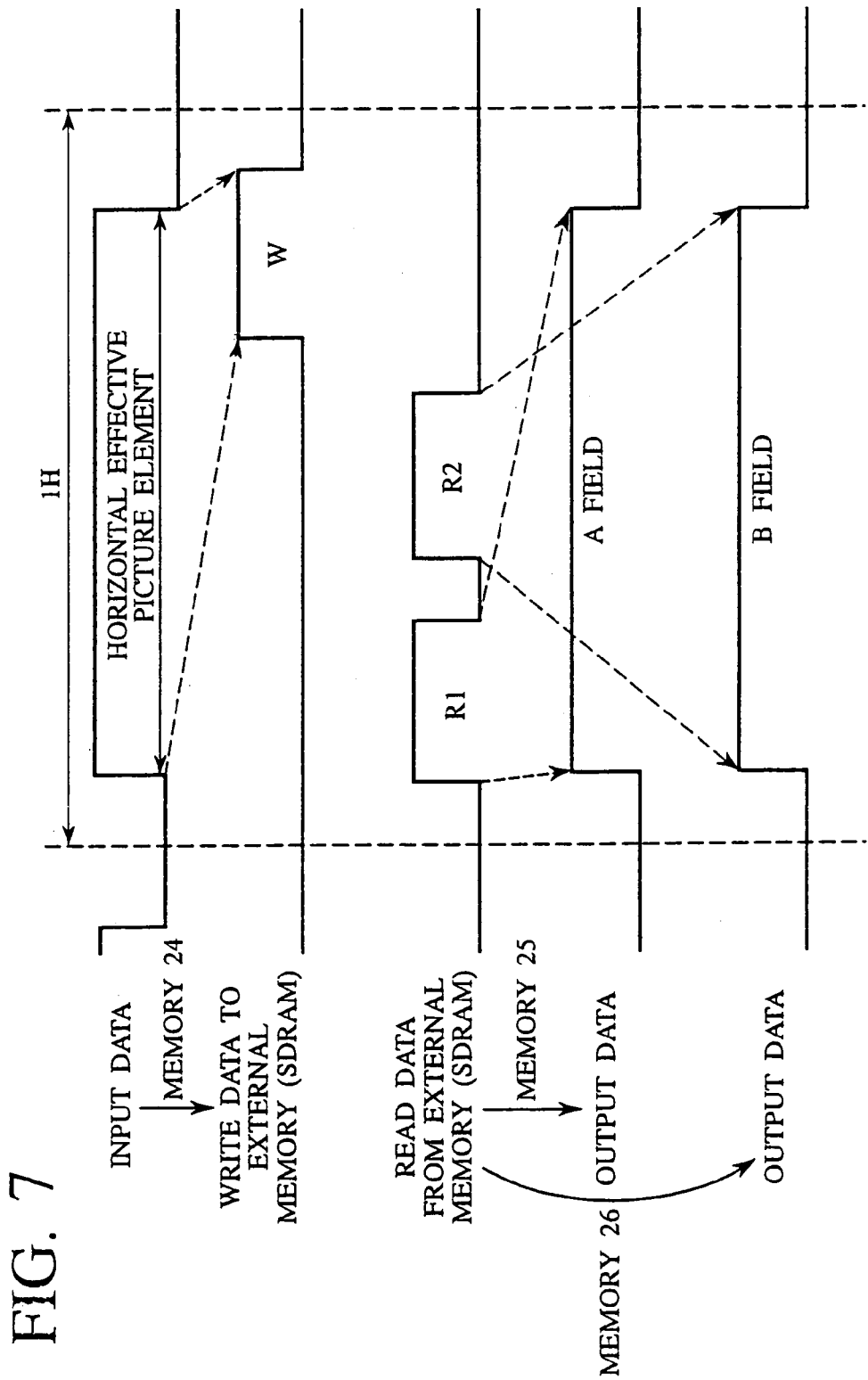
FIG. 7 is a timing chart used for explaining data transfer between the SDRAM and the memory in the video camera of FIG. 5.

According to this embodiment, as shown in FIG. 7 for example, during a period of 1H, input data of horizontal effective pixels from the video camera is synchronized with the clock signal of the SDRAM 28 by passing through the memory 24, thus writing output data from the memory 24 as write data W into the SDRAM 28. Likewise, during this period of 1H, read data R1 read out from the SDRAM 28 is sent to the memory 25 and read data R2, to the memory 26. The read data R1 is output as synchronized with the clock signal of the video camera by passing through the memory 25 and, at the same time, the read data R2 is output as synchronized with the clock signal of the video camera by passing through the memory 26. That is, the write data W to the SDRAM 28 consists of the data of the A and B fields read out from the CCS as shown in FIG. 6, while the read data R1 from the SDRAM 28 consists of, for example, the A-field data and, likewise, the read data R2 from the SDRAM 28 consists of, for example, the B-field data.

As mentioned above, the operation of read-out from the memory 25 which stored therein the read data R1 and the operation of read-out from the memory 26 which stores therein the read data R2 are performed simultaneously, so that the data read out from these memories 25 and 26 is sent to an adder, where that data is summed.

Figure 2:
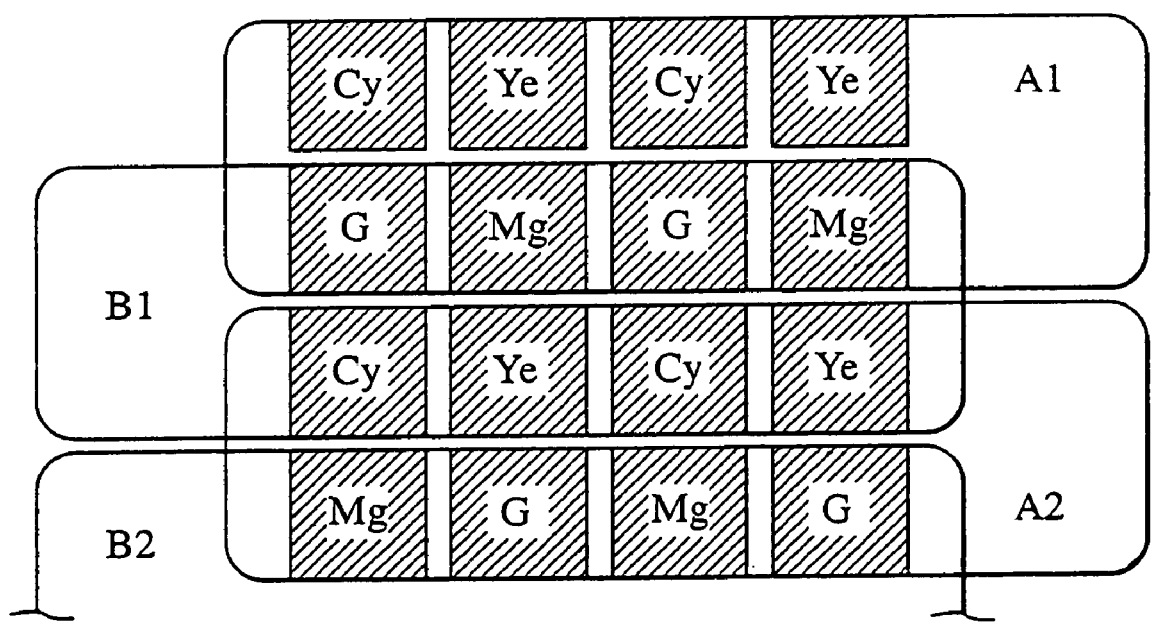
FIG. 2 is an illustration explaining an operation of field-reading-out of an inter-line type CCD.
Figure 3:
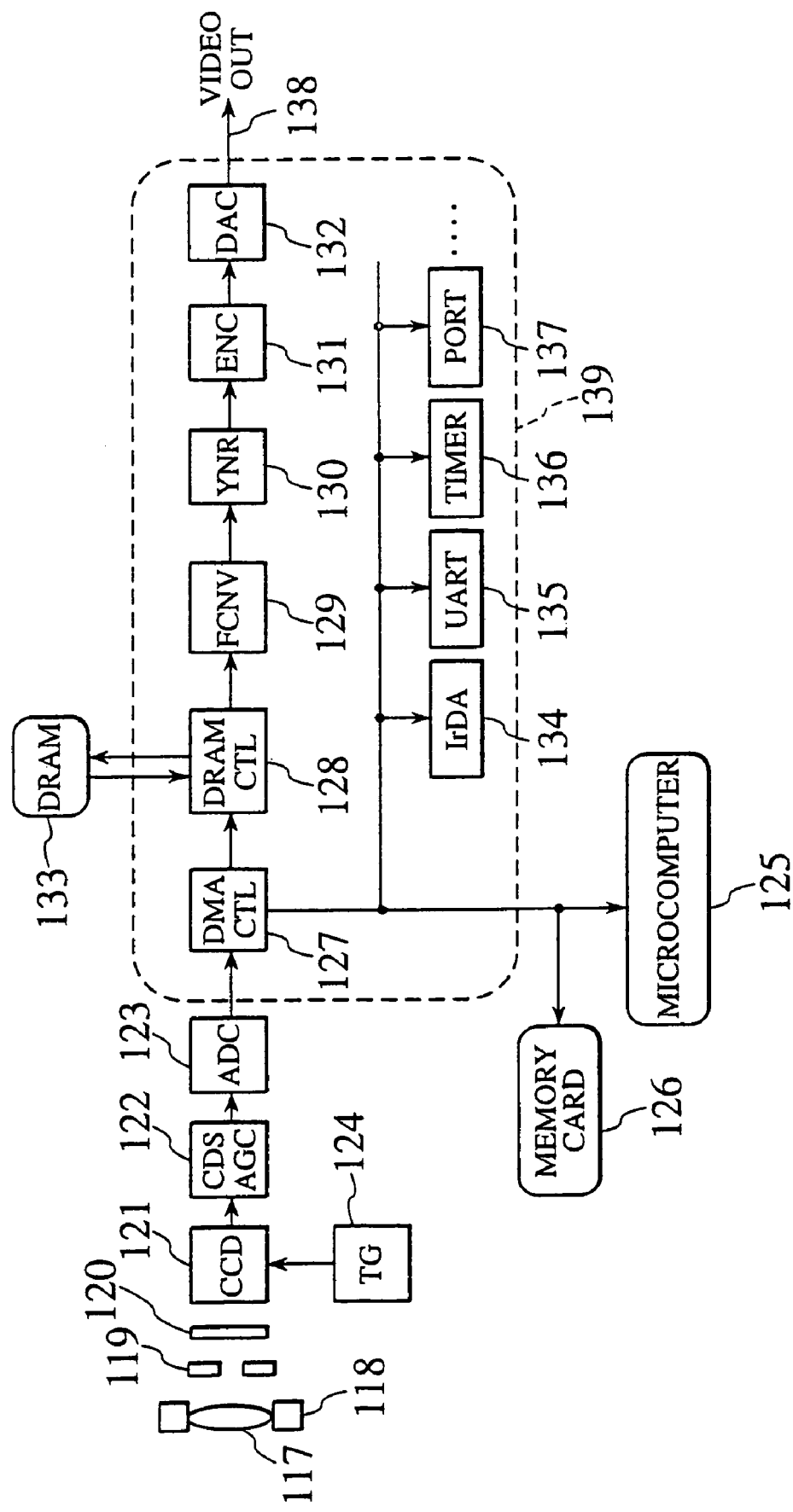
FIG. 3 is a block diagram indicating a rough configuration of a conventional CCD digital camera (digital still camera)

With this, by reading out, as the read data R1 from the SDRAM 28, the first, a1 line and the subsequent (i.e., a1 line, a2 line, . . . ) shown in FIG. 4 and writing them to the memory 25 while reading out, as the read data R2, the first, bi line and the subsequent, (i.e., bi line, b2 line, . . . ) shown in FIG. 4 and writing them to the memory 26 and then reading out these data pieces and adding them to each other at the adder 23, as in the above-mentioned case of FIG. 2, the data can be obtained wherein pixels corresponding respectively to the vertically adjacent color filters of Cy+G, Ye+Mg, Cy+G, Ye+Mg, . . . are mixed as the A1 line, and also the data can be obtained wherein pixels corresponding respectively to the vertically adjacent color filters of Cy+Mg, Ye+G, Cy+Mg, Ye+G, . . . are mixed as the A2 line, which is followed by similar processes for the A3 line, A4 line, . . . (not shown) each comprising the data of vertically adjacent pixels that are mixed.

Furthermore, by reading out, as the read data Ri from the SDRAM 28, the lines of the second, a2 line and the subsequent in FIG. 4 (1. e., a2 line, a3 line, . . . ) and writing them to the memory 25 while reading, as the read data R2, the first, b1 line and the subsequent in FIG. 4 (1. a., b1 line, b2 line, . . . ) and writing them to the memory 26 and then reading these data pieces simultaneously from these memories 25 and 26 and adding them to each other at the adder 23, as in the above-mentioned case of FIG. 2, the data can be obtained wherein picked-up image signals of the pixels corresponding respectively to he vertically adjacent color filters of G+Cy, Mg+Ye, G+Cy, Mg+Ye, . . . are mixed as the Bi line, which is followed by the similar processes for the B2 line, 83 line, each comprising the data of mixed picked-up image signals of the vertically adjacent pixels.

Figure 1:
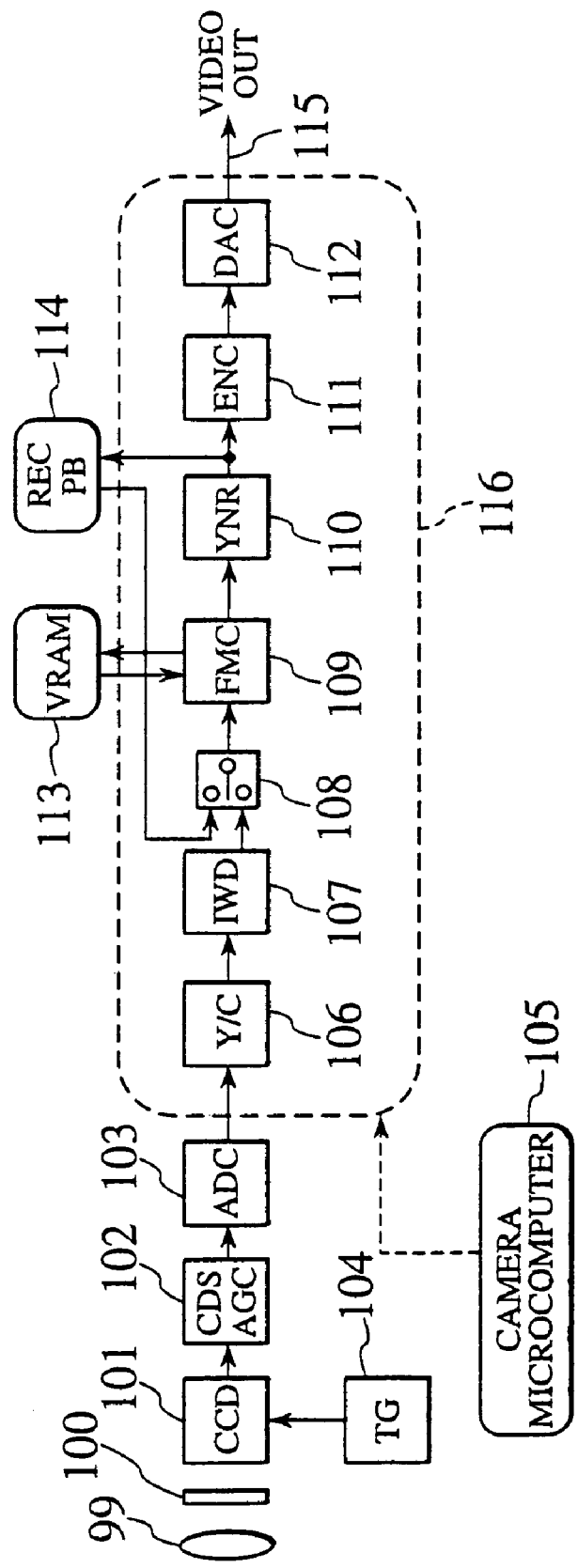
FIG. 1 is a block diagram indicating a rough configuration of a conventional video camera.

In the case of this embodiment, however, a frame picture obtained by adding operations by the adder 23 has an A-field picture and a B-field picture sharing the same shutter timing, thus providing a high-resolution, high quality still picture, not a double-shifted one as in the case where a still picture is generated of a moving subject by use of the above-mentioned conventional video camera shown in FIG. 1.

Thus, still-picture data obtained in the still-picture pickup mode, i.e. frame-picture data obtained by adding by the adder 23 is sent to a signal switching unit 21 controlled in transfer operation by the camera microcomputer 5.

The signal switching unit 21 selectively makes switching between data from the adder 23 and data from the DMACTL unit 33, in which case, it specifically selects the data from the adder 23 and, sends it to the first signal processing block 38 under the control of the camera microcomputer 5.

The data thus supplied from this signal switching unit 21 to the first signal processing block 38 is sent to the signal switching unit 8 and the later-mentioned horizontal pixel density converting (640-720) unit 19, in which case, the still picture data responds to an instruction from the camera microcomputer 5, to be sent via the signal switching unit 8 to the Y/C separating unit 9 and passes through this Y/C separating unit 9, the IWD unit 10, the signal switching unit 11, and the FMC unit 12 to be written to the VRAM 17.

The still picture data written to the VRAM 17 is then read out as demanded by the user and sent via the FMC unit 12, the MIX unit 13, and the YNR unit 14 in this order. The still picture data read out from the YNR unit 14 is sent to the recording/play-back device 18, the ENC unit 15, and the signal switching unit 20.

When outputting still picture data to outside from the output terminal 34, however, that still picture data as output from the YNR unit 14 is processed at the ENC unit 15 and the DAC unit 16. In addition, when recording still picture data to a recording medium using the recording/play-back device 18, that still picture data as output from the YNR unit 14 is sent to the recording/play-back device 18. Furthermore, when recording still picture data to the memory card 6, the still picture data as output from the YNR unit 14 is sent to the signal switching unit 20 to pass it through, and then is sent to the second signal processing block 39. When the signal of a still picture output from the output terminal 34 is displayed on a monitor, that still picture can be displayed without doubling even when its subject is a moving one.

Next, when still picture data is recorded to the memory card 6, the still picture data as supplied from the signal switching unit 20 to the second signal processing block 39 is input to a horizontal pixel density converting (720-640) unit 32.

The horizontal pixel density converting (720-640) unit 32 converts the horizontal pixel density of the picked-up image data of the still picture data as supplied from the first signal processing block 38 from a density of 720 pixels to a density of 640. pixels. The horizontal pixel density converting unit 32 converts a pixel, not of a square lattice, obtained by the video camera to that of a square lattice, specifically, in this embodiment, converting a 720-by-480 pixel density picture according to the NTSC scheme to a 640-by-480 pixel density picture according to VGA scheme.

The picked-up image data obtained after the horizontal pixel density is converted by the horizontal pixel density converting unit 32 is sent to a DMACTL (DMA controller) unit 33.

The DMACTL unit 33 sends the picked-up image data of one screen in DMA (Direct Memory Access) transfer to a memory in a microcomputer 7.

The microcomputer 7 responds to a demand from the user of the video camera according to the invention, to compress in software processing the picked-up image data supplied from the DMACTL unit 33 and record the resultant compressed data to the detachable memory card 6 provided with the semiconductor memory. The compressed data thus recorded to the memory card 6 is read out therefrom as demanded by the user of the video camera according to this embodiment and then taken into the microcomputer 7.

The microcomputer 7, when read out the compressed data from the memory card 6, decompresses it in software processing, to restores the still picture data. The still picture data thus restored by the microcomputer 7 is sent, in DMA transfer, via the DMACTL unit 33 to the signal switching units 21 and 22. In this case, the still picture data is specifically sent via the signal switching unit 21 to the first signal processing block 38.

The still picture data thus read out from the memory card 6 and decompressed and then sent to the first signal processing block 38 is delivered to the horizontal pixel density converting (640-720), unit 19.

The horizontal pixel density converting (640-+720) unit 19 converts the horizontal pixel density of the still picture data supplied from the second signal processing block 39 from a density of 640 pixels to a density of 720 pixels. That is, since the still picture data supplied from the second signal processing block 39 is previously converted at the horizontal pixel density converting unit 32 to a density of 640 by 480 pixels according to the VGA scheme, the horizontal pixel density converting unit 19 of the first signal processing block 38 converts a picture of that 640-by-480 pixel density to a picture of a 720-by-480 pixel density according to the NTSC scheme. The still picture data output from the horizontal pixel density converting (640-720) unit 19 responds to an instruction from the microcomputer 5, to pass through the signal switching unit 11 and is written to the VRAM 17 via the FMC unit 12.

The still picture data thus written to this VRAM 17 is then read out as demanded by the user and passes through the FMC unit 12, the MIX unit 13, and the YNR unit 14 in this order. The still picture data output from the YNR unit 14 is either output to outside via the ENC unit 15 and the subsequent configuration or sent to the recording/play-back device 18 to be recorded to a recording medium.

By the video camera according to this embodiment, it is also possible to transfer still picture data restored by the microcomputer 7 to, for example, a personal computed by, for example, the infrared communications by use of an IrDA (Infrared Communication) unit 29, the asynchronous serial communications by use of a UART (Asynchronous Serial Communication) unit 30, or the serial communications by use of a PORT unit 46. A TIMER unit 31 serves to generate date-and-time information, which is to be added to each still picture as a picture pickup date and time or picture generating date and time.

By the digital camera according to this embodiment, it is also possible to receive at the IrDA unit 29 the still picture data transferred in infrared communications from a personal computer etc., to receive at the UART unit 30 the still picture data transferred in asynchronous serial communications from a personal computer etc., and to receive at the PORT unit 46 the still picture data transferred in serial communications from a personal computer etc. likewise.

The video camera according to this embodiment is provided not only with the function of realizing the above-mentioned moving-picture pickup and high-resolution, high-quality still-picture pickup but also with the title mixing function of mixing a title and other pictures into a picked-up moving picture or still picture.

The following will describe the configuration and operations of mixing a title.

It is supposed here that title picture data to be mixed is recorded beforehand on, for example the memory card 6 in a compressed state, from which the compressed data of the title picture is read out and decompressed by the microcomputer 7 and then recorded via the DMACTL unit 33, the signal switching unit 22, the memory 24, and the buffer 27 to the SDRAM 28.

When the title picture is mixed, the title picture data is always read out from the SDRAM 28 so that the title picture may be displayed as mixed in a picked-up moving picture or still picture only for a desired time lapse. The title picture data read out from the SDRAM 28 passes through, for example, the memory 25 (not using the memory 26 in this case), the adder 23 (not performing adding in this case) and also the signal switching unit 21, to be sent to the first signal processing block 38.

The title picture data thus input to the first signal processing block 38 responds to an instruction from the camera microcomputer 5, to be sent via the horizontal pixel density converting (640-+720) unit 19 to the MIX (picture mixing) unit 13. Here, since. the title picture data is of a 640-by-480 pixel density according to the VGA scheme, the title picture data is caused to pass through the horizontal pixel density converting (640-1720) unit 19 in order to convert that horizontal pixel density from that of 640 pixels to that of 720. pixels.

A this point in time, the MIX unit 13 is supplied with the data of a moving picture currently picked up (moving picture data sent via the FMC 12 from the CCD 1), the data of a reproduced picture from the recording/play-back device 18 (moving-picture data or still-picture data sent from the signal switching unit 11 via the FMC unit 12), or the data of a still picture read out from the memory card 6 (still-picture data sent from the second signal processing block 39), to mix the title picture data into that moving-picture data or still-picture data.

The MIX unit 13 outputs a picture from the video camera or a reproduced picture from the recording/play-back device 18 if the brightness level of the title picture is higher than a reference level and, if that brightness level is lower than the reference level, it outputs the title picture data, thereby mixing these two input pictures and outputs the mixed result. That is, the MIX unit 13 performs the so-called lumikey processing.

The output from the MIX unit 13 is either recorded via the YNR unit 14, as mentioned above, to the recording medium by the recording/play-back device 18 as demanded by the user of this video camera, output to outside, or recorded to the memory card 6. That is, when recorded to the memory card 5 the output from the MIX unit 13 passes through the YNR unit 14 and the signal switching unit 20 and is sent to the second signal processing block 39 to undergo conversion processing at the horizontal pixel density converting (720-640) unit 32 and is sent via the DMACTL unit 33 to the microcomputer 7, where it is compressed and recorded to the memory card 6. When recorded to the recording medium by the recording/play-back device 18, the output of the MIX unit 13, is sent via the YNR unit 14 to the recording/play-back device 18. When output to outside, the output of the MIX unit 13 passes through the YNR unit 14, the ENC unit 15, and the DAC unit 16, to be output from the output terminal 34. It is also possible to read out still picture recorded on the memory card 6 and send it to the first signal processing block 38 to write it to the VRAM 17 and mix it with title picture data at the MIX unit 13 as mentioned above and then send the mixed result via the YNR unit to the recording/play-back device 18 to record it to the recording medium.

In this regard, the picture mixing method performed at the MIX unit 13 can come not only in the so-called lumikey processing but also in the chromakey processing, by which the color-difference signal of a title picture is compared to the reference level before the mixing. The picture to be compared to the reference level may be a video camera play-back picture as well as a title picture.

As described above, according to the video camera according to this embodiment, it is possible to utilizing the mechanical shutter operations by use of the inexpensive inter-line type CCD 1 and irising mechanism 42, thus obtaining a still picture without doubling with even a moving subject.

Furthermore, according to this embodiment, which utilizes the hardware configuration to realize the general function of the video camera of taking a moving picture and the function of the digital still camera of taking a still picture, it is possible to provide an apparatus more inexpensive than a case of a simple combination of the video camera configuration and the digital still camera configuration.

Moreover, according to this embodiment, the hardware circuitry serves to perform the separation processing of the brightness signal and the color signal which used to be done by a digital still camera and the automatic signal processing for auto-focusing and auto-irising of the camera, to reduce the processing time, thus providing the apparatus easier to use.

In addition, according to this embodiment, the video camera function and the digital still camera function are integrally combined with each other, whereby it is possible to easily realize the title mixing and the reception and transmission of still picture data between the recording/play-back device and the memory card as well as copying thereof.

It should be understood that many modifications and adaptations of the invention will become apparent to those skilled in the art and it is intended to encompass such obvious modifications and changes in the scope of the claims appended hereto.

What is claimed is:

1. An image pickup apparatus comprising:
  a moving-picture pickup unit that picks up a moving picture and outputs a first moving-picture signal having a first horizontal pixel density;
  a storage unit that stores a still picture having a second horizontal pixel density;

a first horizontal pixel density conversion unit that reads out the still picture from the storage unit and converts the second horizontal pixel density thereof into the first horizontal pixel density;

a picture synthesis unit that synthesizes the still picture having a horizontal pixel density having been converted into the first horizontal pixel density by the first horizontal pixel density conversion unit with one of the first moving-picture signal outputted from the moving-picture pickup unit and second moving-picture signal having the first horizontal pixel density;

a second horizontal pixel density conversion unit that converts the first horizontal pixel density of the synthesized picture outputted from the picture synthesis unit into the second horizontal pixel density; and a write control unit that writes the synthesized picture outputted from the second horizontal pixel density conversion unit into the storage unit.

2. The image pickup apparatus according to claim 1, further comprising:
a recording/reproducing unit that records the first moving-picture signal and reproduces a signal corresponding to the first moving-picture signal as the second moving-picture signal; and
a signal switching unit that selectively supplies the first moving-picture signal and the second moving-picture signal to the picture synthesis unit.

3. The image pickup apparatus according to claim 1, wherein the still picture stored in the storage unit is a title picture.

4. The image pickup apparatus according to claim 1, wherein the synthesized picture written into the storage unit is a still picture.

5. An image pickup apparatus comprising:
a moving-picture pickup unit that picks up a moving picture and outputs a first moving-picture signal having a non-tetragonal lattice;
a storage unit that stores a still picture having a tetragonal lattice;
a first converting unit that reads out the tetragonal lattice of the still picture read out from the storage unit into a non-tetragonal lattice;
a picture synthesis unit that synthesizes the still picture having been converted by the first converting unit to have the non-tetragonal lattice and one of the first moving-picture signal outputted from the moving-picture pickup unit and a second moving-picture signal having the non-tetragonal lattice;
a second converting unit that converts the non-tetragonal lattice of the synthesized picture outputted from the picture synthesis unit into the tetragonal lattice; and
a write control unit that writes the synthesized picture outputted from the second converting unit into the storage unit.

6. The image pickup apparatus according to claim 5, further comprising:
a recording/reproducing unit that records the first moving-picture signal and reproduces a signal corresponding to the first moving-picture signal as the second moving-picture signal; and
a signal switching unit that selectively supplies the first moving-picture signal and the second moving-picture signal to the picture synthesis unit.

7. The image pickup apparatus according to claim 5, wherein the still picture stored in the storage unit is a title picture.

8. The image pickup apparatus according to claim 5, wherein the synthesized picture written into the storage unit is a still picture.

9. A signal processing method using in an image pickup apparatus, the method comprising:
an outputting step of picking up a moving picture and outputting a first moving-picture signal having a first horizontal pixel density;
a reading-out step of reading out a still picture having a second horizontal pixel density stored in a storage unit;
a first converting step of converting the second horizontal pixel density of the still picture read out from the storage unit into the first horizontal pixel density;
a synthesizing step of synthesizing the still picture having a horizontal pixel density that is converted into the first horizontal pixel density by the first converting step and one of the first moving-picture signal outputted by the outputting step and a second moving-picture signal having the first horizontal pixel density;
a second converting step of converting the first horizontal pixel density of the synthesized picture synthesized by the synthesizing step into the second horizontal pixel density; and
a writing step of writing the synthesized picture converted by the second converting step into the storage unit.

10. The signal processing method according to claim 9, further comprising:
a reproducing step of recording the first moving-picture signal outputted by the outputting step and reproducing a signal corresponding to the first moving-picture signal as the second moving-picture signal; and
a switching step of switching between the first moving-picture signal and the second moving-picture signal as a moving-picture signal to be synthesized with the still picture by the synthesizing step.

11. The signal processing method according to claim 9, wherein the still picture stored in the storage unit is a title picture.

12. The signal processing method according to claim 9, wherein the synthesized picture written into the storage unit is a still picture.

13. A signal processing method using in an image pickup apparatus, the method comprising:
an outputting step of picking up a moving picture and outputting a first moving-picture signal having a non-tetragonal lattice;
a reading-out step of reading out a still picture having a tetragonal lattice stored in a storage unit;
a first converting step of converting the tetragonal lattice of the still picture read out from the storage unit into a non-tetragonal lattice;
a synthesizing step of synthesizing the still picture converted by the first converting step to have the non-tetragonal lattice and one of the first moving-picture signal outputted by the outputting step and a second moving-picture signal having the non-tetragonal lattice;
a second converting step of converting the non-tetragonal lattice of the synthesized picture synthesizing by the synthesizing step into the tetragonal lattice; and
a writing step of writing the synthesized picture converted by the second converting step into the storage unit.

14. The signal processing method according to claim 13, further comprising:
a reproducing step of recording the first moving-picture signal outputted by the outputting step and reproducing a signal corresponding to the first moving-picture signal as the second moving-picture signal; and a switching step of switching between the first moving-picture signal and the second moving-picture signal as a moving-picture signal to be synthesized with the still picture by the synthesizing step.

15. The signal processing method according to claim 13, wherein the still picture stored in the storage unit is a title picture.

16. The signal processing method according to claim 13, wherein the synthesized picture written into the storage unit is a still picture.

* * * * *